United States Patent [19]

Schossow

[11] 4,171,089

[45] Oct. 16, 1979

[54] HEAT EXCHANGER

[75] Inventor: George W. Schossow, 2316 Lilac La., White Bear Lake, Minn. 55110

[73] Assignees: George W. Schossow, White Bear Lake; Merchant, Gould, Smith, Edell, Welter & Schmidt, P.A., Minneapolis, both of N. Mex., part interest to each

[21] Appl. No.: 798,567

[22] Filed: May 19, 1977

[51] Int. Cl.² .............................................. F24B 7/00
[52] U.S. Cl. .................................. 237/55; 126/85 B; 126/117; 165/DIG. 2; 126/112
[58] Field of Search ......................... 165/DIG. 2, 140; 126/117, 112, 85 B, 108; 122/20 B; 237/55

[56] References Cited

U.S. PATENT DOCUMENTS

| 2,751,900 | 6/1956 | Modine | 126/110 B |
| 3,120,225 | 2/1964 | Stark et al. | 165/DIG. 2 |
| 3,147,084 | 9/1964 | Franzen et al. | 165/140 X |
| 3,934,572 | 1/1976 | Teague, Jr. | 126/85 B X |
| 3,934,798 | 1/1976 | Goldsmith | 237/55 |
| 3,944,136 | 3/1976 | Huie | 165/DIG. 2 |
| 4,034,803 | 7/1977 | Reed et al. | 165/DIG. 2 |

Primary Examiner—William E. Wayner
Assistant Examiner—William E. Tapolcai, Jr.

Attorney, Agent, or Firm—Merchant, Gould, Smith, Edell, Welter & Schmidt

[57] ABSTRACT

A self-cleaning heat exchanger in combination with a home furnace system which draws combustion air from outside the home is disclosed. Gases of combustion are drawn up through a plurality of vertical tubes and out a chimney by a fan mounted in the chimney. The lower portions of the tubes are cooled by inside air drawn over them by the return air blower of the furnace, the upper portions of the tubes are cooled by cold outside air drawn across them by the furnace burner unit. Moisture which condenses in the upper portions of the tubes is drawn down through them by gravity. The higher temperature in the lower part of the tubes causes this condensate to revaporize and rise to the upper portion of the tubes, where the process repeats itself. As more water vapor enters the tubes in the flue gas, distilled condensate eventually drops out of the tubes and runs into a drain at the lower end of the heat exchanger. The moisture from condensation of the combustion gases scrubs pollutants from the flue gases passing through the tubes, and is slightly acidic, providing a cleaning function for the interior of the heat exchanger tubes. The heat exchanger is also suitable for use in commercial furnace systems and combustion-type power plants which utilize outside air for combustion.

4 Claims, 3 Drawing Figures

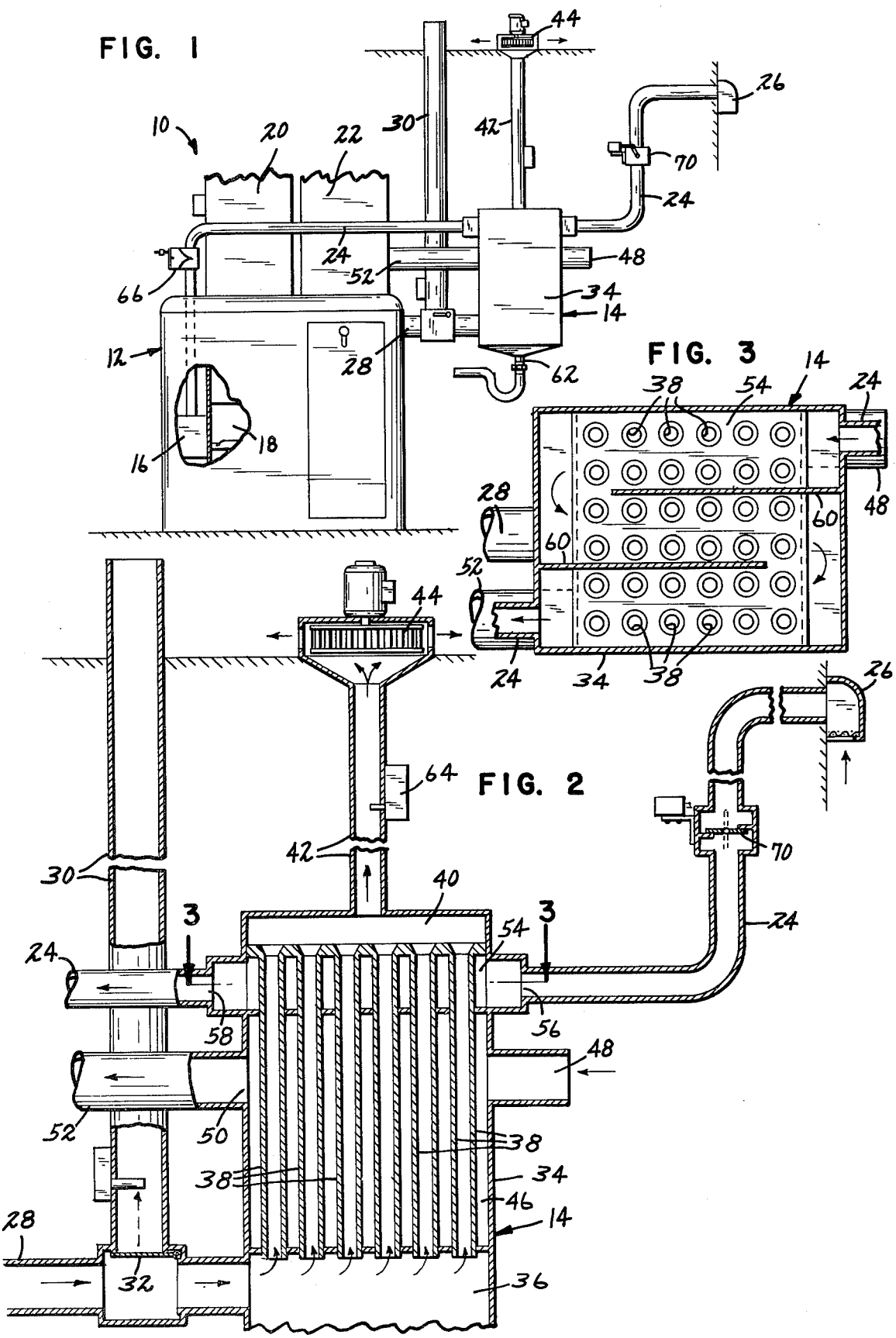

HEAT EXCHANGER

BACKGROUND OF THE INVENTION

1. Field of the Invention

This invention relates generally to the field of heat exchangers used in combination with power plants, and commercial and residential heating systems. More particularly, this invention relates to the field of heat exchangers for use in home heating systems which draw cold air from outside the home for combustion.

2. Description of the Prior Art

As has been pointed out in my pending patent application Ser. No. 775,253, now abandoned home heating systems which utilize air from outside the home for combustion purposes offer significant advantages over conventional home heating systems, which draw combustion air from inside the home. Among these advantages are: (1) fuel savings due to the fact that heated room air is not being expelled up the chimney to be replaced by cold air seeping into the home; and (2) the elimination of the need for a humidifier to keep room air at a livable humidity level.

Because such systems draw cold air into their burner units rather than drawing air that has already been heated, the firebox temperature of such systems may be slightly lower than that of conventional systems. Additionally, as the stack gases proceed up the chimney, moisture contained in those gases condenses on the inside of the chimney, where it may cause chimney freeze up. Finally, the hot combustion gases being exhausted up the chimney represent wasted heat, which could be used for further room heating.

It is known in conventional furnace systems to utilize the hot stack gases for room heating by diverting the stack gases through a heat exchanger which distributes some of the heat from the flue gases to inside air. One such system is disclosed in U.S. Pat. No. 3,813,039. Heretofore, however, there has not been a furnace system which not only utilized the heat from flue exhaust gases to heat up air circulating within the home, but also was adapted to draw cold air from outside the home for combustion purposes, raise the temperature of that air slightly so as to increase the temperature of the firebox, and decrease the temperature and moisture content of the flue gases.

In the past, industrial combustion systems, such as coal-burning power plants, have utilized cyclone separators, electrostatic precipitators, and wet scrubbers to clean the stack gases of fly ash and pollutants. One of the problem pollutants has been sulpher, which is exhausted to atmosphere as sulpher dioxide. Power plants and commercial boilers thus utilize expensive, extremely tall chimney stacks to exhaust noxious gases well away from residential levels. Until the present invention, a system has not been known which satisfactorily scrubs the pollutants from the stack gases, eliminating the need for very high chimneys, and retrieves heat energy for subsequent work.

SUMMARY OF THE INVENTION

In accordance with the present invention, a furnace system suitable for residential use is provided, which draws air for combustion via a conduit extending from a point outside the home into the burner unit of the furnace. Along its route, the conduit is plumbed into a self-cleaning heat exchanger constructed in accordance with the present invention. The heat exchanger includes a plurality of vertically oriented tubes which are in fluid communication at their lower ends with a conduit carrying the gaseous products of combustion away from the burner unit. At their upper ends, the tubes are in fluid communication with a chimney stack in the outlet of which a fan is mounted to induce a draft up the chimney.

The lower portions of the tubes extend through a first chamber which has an upstream vent to inside air and a downstream outlet which is plumbed to the return air plenum of the heating system. This arrangement allows room air from the vicinity of the furnace to be drawn across the tubes, thus picking up some heat before being passed into the circulation system of the furnace.

Near their upper ends, the tubes pass through a second chamber which has an upstream inlet attached to the outside air conduit, and a downstream outlet from which the combustion air conduit proceeds to the burner unit of the furnace. Thus, the cold air being drawn from outside the home by the burner unit passes through the upper chamber of the heat exchanger and circulates around the upper end portions of the gas-carrying tubes. Thus, the temperature of the cold combustion air is increased before combustion, so as to keep the temperature of the firebox at a preferred level without an excess use of fuel, and the hot flue gases are cooled to the point where the moisture carried by those gases condenses on the tube wall and runs down the tube walls. The stack gases proceed up the chimney and are exhausted from the home. As the condensate runs down the tubes, it revaporizes in the hot, lower portion thereof, and is carried back towards the top of the tubes, recycling and redistilling itself as the process continues. The continuous addition of more water vapor to the inside tube environment creates a relatively low dew point situation therein, and the upward passage of particulate matter through the tubes causes "rain" therein. This phenomenon in turn acts to scrub the exhaust gases of pollutants such as the $SO_2$, which reacts with the water to form sulphuric acid.

By virtue of the fact that the slightly acidic moisture from the stack gases condenses at the upper end of the heat exchanger tubes and runs down the tubes as a result of gravity, the heat exchanger tubes enjoy a self-cleaning feature. At the lower end of the heat exchanger, a drain collects the moisture run off from the tubes.

It will be appreciated from the foregoing that the present invention results in even greater fuel savings in home heating systems drawing combustion air from outside the home. The warming of the combustion air before combustion results in a higher temperature firebox without a greater rate of combustion. The utilization of the stack gases to heat up circulating room air further lessens the burden on the burner unit. The extraction of moisture from the stack gases before their exhaust eliminates the possibility of chimney freeze up, and acts to scrub pollutants from the stack gases.

BRIEF DESCRIPTION OF THE DRAWINGS

FIG. 1 is a view in side elevation, with portions thereof broken away, showing the furnace/heat exchanger combination of the present invention.

FIG. 2 is an enlarged view in section of a portion of FIG. 1, with portions thereof broken away.

FIG. 3 is a view in section taken along the line 3—3 of FIG. 2, and indicating the flow of combustion air through the upper chamber of the heat exchanger.

DESCRIPTION OF THE PREFERRED EMBODIMENT

Referring first to FIG. 1, there is disclosed a furnace/heat exchanger combination, generally designated by the numeral 10, in which a furnace 12 is coupled with a heat exchanger 14 constructed in accordance with the present invention. Furnace 12 comprises a burner unit 16, including a blower or fan (not shown) which draws air to be mixed with the fuel for combustion. A flame burns in firebox 18 to heat air which is subsequently distributed through the home via duct 20, and which is returned to the furnace for reheating via duct or plenum 22.

Burner unit 16 draws combustion air from outside the home via conduit 24, which extends from burner unit 16 to vent 26, which is located outside the home, the gaseous products of combustion are exhausted from furnace 12 via exhaust conduit 28, and may be selectively exhausted up chimney stack 30 or routed through heat exchanger 14. A manually operated bypass gate 32 is used to select which route exhaust gases will take.

Exhaust gases enter heat exchanger 14 when gate 32 closes chimney 30, as clearly shown in FIG. 2. Heat exchanger 14 comprises an outer wall 34 which encloses four chambers. The lowermost chamber 36 is a plenum into which the gaseous products of combustion flow via exhaust conduit 28. A plurality of vertically oriented tubes 38 are in fluid communication with lower chamber 36. Heat exchanger tubes 38 are of a type known in the art, such as those constructed with a copper outer wall and a corrosion-resistant inner wall of ceramic or teflon. As indicated in FIG. 2, the exhaust gases flow upwardly through tubes 38. At their uppermost ends, tubes 38 are in fluid communication with chimney stack 42. Mounted in the mouth of chimney stack 42 is a driven fan 44. The action of heat exchanger 14 causes the flue gases to cool markedly before reaching chimney 42, thus reducing the volume of the flue gases by 50% to 70%, with the result that fan 44 need not be a large power consuming fan in order to create the desired negative pressure in chimney 42. Since fan 44 is mounted downstream of heat exchanger 14, a negative pressure is created within tubes 38, which induces a draft upwardly through the heat exchanger so as to draw the exhaust gases through exhaust conduit 28, into lower chamber 36, through tubes 38 into chamber 40, and upwardly through chimney 42, and thus out of the house.

There are two intermediate chambers in heat exchanger 14. The lowermost of these chambers 46 has an upstream inlet 48, which is open to room air. Chamber 46 has a downstream outlet 50 which is in communication with the return air plenum 22 of the furnace via duct 52. The return air blower of the furnace (not shown) thus draws air from inside the home in the vicinity of the heat exchanger through chamber 46, where it circulates around tubes 38 before passing into the recirculation system of the furnace.

The uppermost intermediate chamber, indicated by the numeral 54, has upstream inlet 56 and downstream outlet 58 into which combustion air conduit 24 enters and exits.

Both chambers 46 and 54 are partitioned by vertically extending baffles 60, as shown in FIG. 3, so as to insure complete circulation around tubes 38 of the air entering and exiting those chambers.

Heat exchanger 14 includes a drain 63 located at its lower end to drain away the moisture which condenses and runs down tubes 38 into chamber 36.

Mounted in chimney stack 42 is a pressure sensitive switch 64 which is operably connected to burner unit 16 by means not shown, but well known in the art, and is adapted to prevent burner unit 16 from igniting, and to turn burner 16 off, if the appropriate negative pressure does not exist within chimney stack 42, i.e. if a draft up through the heat exchanger does not exist. Combustion air conduit 24 also includes the safety devices discussed in my pending patent application previously referred to, including a barometric draft regulator 66 mounted in a tee section of conduit 24 shown in FIG. 1, and a butterfly valve 70 which is normally open, but closes after a time delay following shut off of burner unit 16.

In operation, thermostatic control means (not shown) turn on fan 44 and open butterfly valve 70. When the appropriate draft up chimney 42 is sensed by switch 64, burner unit 16 is ignited. Cold air from outside the home is drawn into burner unit 16 via conduit 24 for combustion purposes. This cold air circulates through chamber 54 of heat exchanger 14 before passing into burner unit 16. The gaseous products of combustion are exhausted from firebox 18 via conduit 28 into lower chamber 36 of heat exchanger 14, where they are drawn up through tubes 38 and exit via chimney stack 42. The return air blower (not shown) of furnace 12 draws air from inside the home in through chamber 46 of heat exchanger 14 before entering the recirculation system of furnace 12. As the hot stack gases pass upwardly through tubes 38, cool inside air circulates around their lower portions where it picks up heat from them. At this point, the slightly acidic moisture carried within the exhaust gases condenses on the walls of tubes 38 and is drawn by gravity downwardly into chamber 36 and carried away via drain 62. This action of the moisture keeps tubes 38 clean. The cold combustion air travelling through conduit 24 is heated as it passes through chamber 54 and thus passes into burner unit 16 in a warmed state.

It will be appreciated from the foregoing that I have prevented a system which utilizes outside air for combustion purposes, thus having the fuel saving and humidifying advantages previously discussed, which utilizes hot stack gases to warm the combustion air slightly so as not to require a greater rate of combustion to keep the firebox at its desired temperature, and which utilizes the hot stack gases to preheat some of the recirculating air home. In addition, the cool air circulating through the heat exchanger cools down the stack gases and removes the moisture from them. Finally, the heat exchanger of the invention scrubs the flue gases of pollutants, particularly $SO_2$, and of particular matter, and is self-cleaning, requiring little or no maintenance.

What is claimed is:

1. The combination of a home furnace system wherein the furnace burner draws combustion air from outside the home with a heat exchanger which cools stack gases and removes moisture therefrom before the stack gases are exhausted from the home, warms outside combustion air before it reaches the burner, and warms cool inside air before recirculating it through the furnace, said heat exchanger comprising:

(a) a plurality of vertically oriented tubes having lower ends in fluid communication with a conduit carrying stack gases from the furnace, and upper ends in fluid communication with a chimney;

(b) a combustion air chamber which extends around portions of said tubes adjacent their upper ends, said combustion air chamber being in fluid communication with a source of cold air exterior to the home and with the furnace burner;

(c) a cold return air chamber which surrounds portions of said tubes adjacent their lower ends, said return air chamber having a downstream outlet in fluid communication with the return air blower, and an upstream inlet in fluid communication with the ambient inside air of the home;

(d) a fan mounted in the chimney for inducing a draft up the chimney; and (e) means for draining moisture of condensation which runs down the tubes.

2. The furnace-heat exchanger combination of claim 1 which further includes pressure sensitive control means mounted in the chimney and operably connected to the furnace burner for igniting the burner when the fan creates a negative pressure within the chimney, and for turning the burner off when no such negative pressure is present.

3. The furnace-heat exchanger combination of claim 2 which further includes means for bypassing the heat exchanger and diverting the stack gases to a second chimney.

4. A heat exchanger suitable for use in home furnace systems wherein the furnace burner draws combustion air from outside the home, and in commercial systems wherein outside air is used for combustion by a burner, comprising:

(a) a combustion air chamber having an upstream end in fluid communication with a first conduit carrying outside air and a downstream end in fluid communication with a second conduit carrying air from the chamber to the furnace burner;

(b) a plurality of vertically oriented tubes, portions of which extend transversely through the combustion air chamber, said tubes having bottom ends in fluid communication with a conduit carrying exhaust gases from the burner, and having top ends in fluid communication with a chimney;

(c) means for inducing a draft up the chimney; wherein (d) the portions of said tubes which extend through the combustion air chamber are adjacent the top ends of said tubes; and (e) a return air chamber in fluid communication with a return air conduit of the system, said return air chamber being positioned below the combustion air chamber; wherein (f) the bottom ends of said tubes are adjacent means for draining condensation liquids from the heat exchanger.

* * * * *

UNITED STATES PATENT AND TRADEMARK OFFICE
CERTIFICATE OF CORRECTION

PATENT NO. : 4,171,089
DATED : October 16, 1979
INVENTOR(S) : George W. Schossow It is certified that error appears in the above-identified patent and that said Letters Patent are hereby corrected as shown below:

On the title page, under Assignees, "N. Mex." should be --Minnesota--.

In Column 1, line 14, after "abandoned" insert --.--

Signed and Sealed this

Twenty-fifth Day of March 1980

[SEAL]

Attest:

SIDNEY A. DIAMOND

Attesting Officer

Commissioner of Patents and Trademarks